United States Patent [19]
McCarthy

[11] Patent Number: 5,287,268
[45] Date of Patent: * Feb. 15, 1994

[54] CENTRALIZED CONSUMER CASH VALUE ACCUMULATION SYSTEM FOR MULTIPLE MERCHANTS

[76] Inventor: Patrick D. McCarthy, 4384 Bowling Blvd., Louisville, Ky. 40207

[*] Notice: The portion of the term of this patent subsequent to Jul. 10, 2007 has been disclaimed.

[21] Appl. No.: 976,965

[22] Filed: Nov. 16, 1992

Related U.S. Application Data

[63] Continuation of Ser. No. 797,401, Nov. 26, 1991, which is a continuation of Ser. No. 510,466, Apr. 18, 1990, Pat. No. 5,117,355, which is a continuation of Ser. No. 303,319, Jan. 27, 1989, Pat. No. 4,941,090.

[51] Int. Cl.$^5$ .................. G07G 1/12; G06F 15/00; G06F 15/20
[52] U.S. Cl. .................. 364/405; 364/406; 364/408
[58] Field of Search ............. 364/401, 405, 406, 408; 235/487

[56] References Cited

U.S. PATENT DOCUMENTS

| | | | |
|---|---|---|---|
| 4,360,872 | 11/1982 | Suzuki et al. | 364/405 |
| 4,594,663 | 10/1986 | Nagata et al. | 902/22 X |
| 4,669,730 | 6/1987 | Small | 902/23 X |
| 4,673,802 | 6/1987 | Ohmae et al. | 364/406 |
| 4,722,054 | 1/1988 | Yorozu et al. | 902/22 X |
| 4,750,119 | 6/1988 | Cohen et al. | 364/401 |
| 4,941,090 | 7/1990 | McCarthy | 364/405 |
| 5,117,355 | 5/1992 | McCarthy | 364/405 |
| 5,202,826 | 4/1993 | McCarthy | 364/405 |

Primary Examiner—Roy N. Envall, Jr.
Assistant Examiner—Khai Tran
Attorney, Agent, or Firm—Wood, Herron & Evans

[57] ABSTRACT

A centralized system of accumulating cash value for consumers based upon point-of-sale transactions with multiple merchants is disclosed wherein for each transaction, the consumer's account number (such as the Social Security number) which may be different from the consumer's credit card account number, for example, is transmitted to a central system along with data identifying the merchant and a credit value for the transaction. The credit value may be based upon predetermined incentives associated with the transaction such as coupons, rebates or discounts, and/or upon a credit rate determined by the merchant applied to the amount of the transaction. At the central location, a cash value for that consumer is incremented by the credit value and a bill value for that merchant is similarly incremented. Periodically, the merchants are billed for the accumulated bill value or credited for any third party incentive amounts confirmed at the central location. Also, at selected intervals, consumers are given access to their respective accumulated cash values by either a check in that amount or through a funds dispensing electronic terminal access or the like.

13 Claims, 1 Drawing Sheet

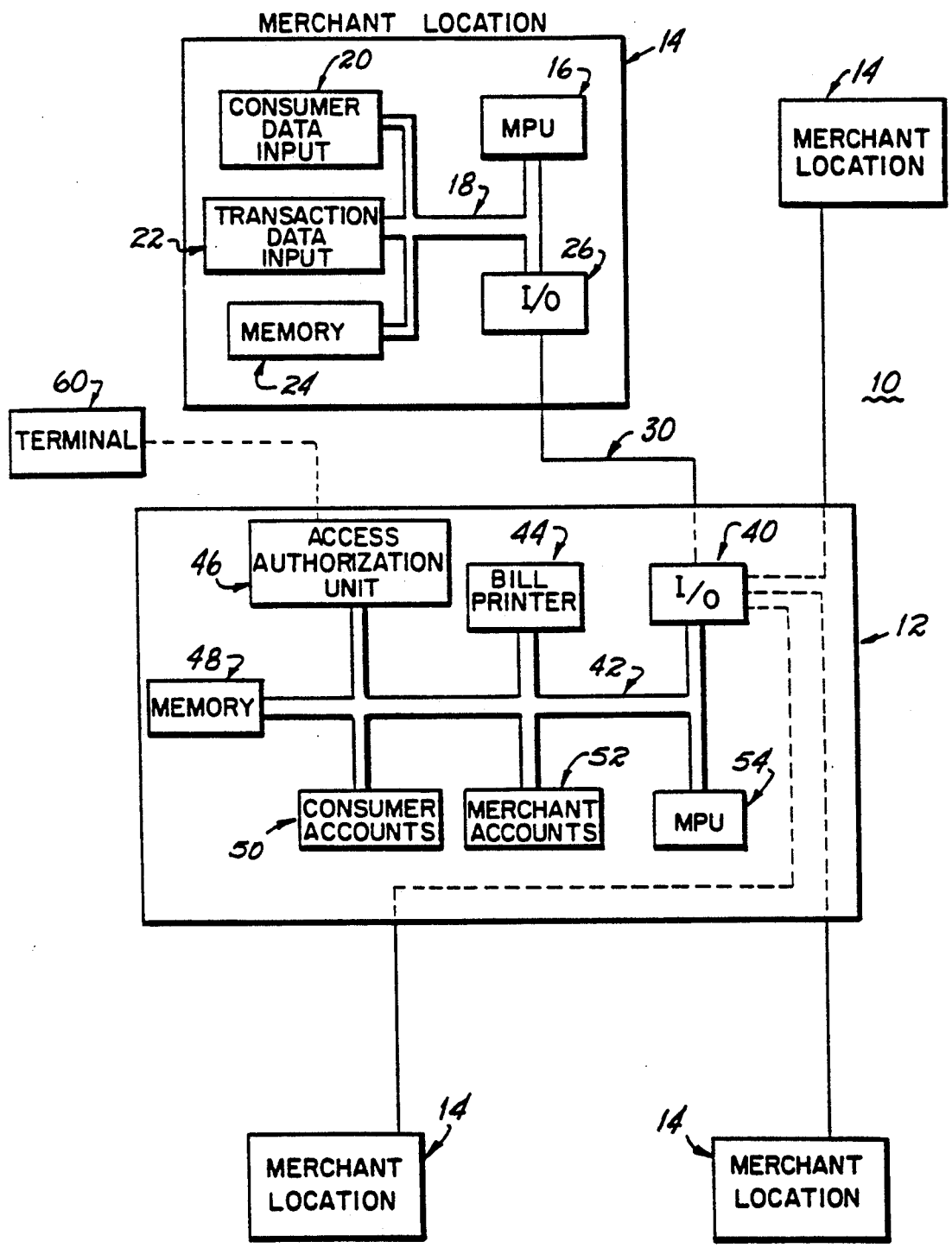

CENTRALIZED CONSUMER CASH VALUE ACCUMULATION SYSTEM FOR MULTIPLE MERCHANTS

RELATED APPLICATIONS

This application is a continuation of my application Ser. No. 07/797,401, filed Nov. 26, 1991, which is a continuation of my application Ser. No. 07/510,446, filed Apr. 18, 1990 (now U.S. Pat. No. 5,117,355), which is a continuation of my application Ser. No. 07/303,319, filed Jan. 27, 1989, now U.S. Pat. No. 4,941,090.

FIELD OF THE INVENTION

The present invention relates to a centralized system of accumulating cash value for consumers based upon point-of-sale transactions by which credit incentives may be provided to consumers without reducing a merchant's current cash flow. More specifically, the present invention relates to such a system in which each participating merchant may set its own credit rate for cash value to accumulate on each sale irrespective of a rate set by any other merchant and independent of a central authority.

SUMMARY OF THE INVENTION

In accordance with the principles of the present invention, a consumer, upon making a purchase from a merchant, will obtain a credit value equal to a portion of the amount of the purchase. The portion which is to be credited is determined at the point-of-sale from a rate which may be selected by that merchant irrespective of the rate selected by any other merchant and independent of a central authority. Alternatively, the rate may be based in whole or in part upon a preassigned rebate or coupon value such as from a third party, or a combination of preassigned and merchant selected factors. The credit value is then transmitted to a central system communicating with all of the participating merchants, whereat the credit value is added to a cash value maintained for that consumer's account. At preselected intervals, such as on the occasion of the consumer's birthday, that consumer is given access to cash in an amount equal to the accumulated cash value. The credit value may also be added to a bill value maintained in an account for the involved merchant. The merchant may be periodically billed the accumulated bill value amount where consumer credit values are discounts or rebates from the merchant. Alternatively, where credit values are based upon preassigned rebate or coupon values from third parties, the bill value may be utilized to track compliance by the merchant and all of the bill values utilized for billing the third parties. To reduce security problems, the consumer provides the merchant at the point-of-sale only the consumer's account number and, perhaps, birthdate. To avoid necessity for issuing account numbers to consumers, the account number may be the consumer's Social Security number. This information may be encoded in a magnetic strip of a plastic card which is inserted into a reader at the point-of-sale. A credit value is then determined based either upon a coupon or rebate value amount input by the merchant at the point-of-sale and/or upon the amount of the sale and the credit rate as input by the merchant. The determined credit value is then transmitted to the central system along with the consumer's account number and, perhaps, birthdate whereat the credit value is added to the cash value maintained in the consumer account associated with that unique account number and, perhaps, the birthdate.

While groups of consumers may share a common birthdate (month and day, for example) Social Security numbers are unique. Hence, Social Security numbers are preferably utilized as consumer account numbers to access the appropriate account to increase the cash value according to the credit value, while birthdates may optionally be used to verify that the account is appropriate. On the other hand, for giving the consumer access money, all accounts sharing a selected birthdate may be accessed and individually an authorization issued to allow each consumer to access cash in the amount of the accumulated cash value in that consumer's account. Preferably, the consumer may then access the money through an electronic terminal for dispensing funds such as a bank terminal or the like which communicates with the central system to issue funds when the authorization is present. Alternatively, the central system may issue checks to the consumers. In this way, consumers build up cash value by buying products from participating merchants independent of how that product is paid for, such as by cash, check or credit card. Further, utilization of the system enables merchants to attract consumers to their place of business with the promise of subsequent cash rebates based upon purchases by that consumer. And, as each merchant may independently select the rate at which credit is earned, and independent of the central system, merchants are free to use varying levels of incentive depending upon the type of product (or service) involved and other economic or commercial considerations.

Yet further, because the information related to credits and accounts is handled at a centralized system, the merchants are freed from handling the paperwork and/or devoting valuable computer time and space and operating personnel to the management of the cash value accumulating system. Security is also enhanced because the myriad of sales personnel and other employees of the various merchants will not have "exit" access to the consumer accounts (i.e., to obtain authorization to access funds or have checks issued).

These and other objects and advantages of the present invention shall be made apparent from the accompanying drawing and the description thereof.

BRIEF DESCRIPTION OF THE DRAWING

The accompanying drawing, which is incorporated in and constitutes a part of this specification, illustrates an embodiment of the invention and, together with a general description of the invention given above, and the detailed description of an embodiment given below, serves to explain the principles of the invention.

The FIGURE is a block diagram of an exemplary consumer cash value accumulating system in accordance with the principles of the present invention.

DETAILED DESCRIPTION OF THE DRAWING

With reference to the FIGURE, there is shown a block diagram of an exemplary customer cash value accumulating system 10 having a central system 12 and a plurality of merchant locations 14, in this case four although there could be more or fewer than four. Each merchant location 14 includes at least one computer unit 16 such as a microprocessor and associated peripherals which communicates, over a common bus 18, for example, with a consumer data input device 20, a transaction data input device 22, a memory 24 and an input/output (I/O) device 26.

Consumer data input device 20 is located at the point-of-sale to a consumer of merchandise or services from a selected merchant. Device 20 may be a keyboard into which a consumer may enter the consumer's account number and, if required, date of birth. In a preferred embodiment, the consumer s Social Security number is used as the account number. Alternatively, device 20 may take another form such as a magnetic card reader adapted to read the magnetic stripe on a plastic card inserted into the reader. In the latter event, the magnetic stripe would be encoded with the consumer's account number and, if required, date of birth. Where a plastic card is used, device 20 may also include a keyboard for entry of a personal identification number (PIN) by which to verify against a code stored in the magnetic stripe that the card is being used by the appropriate individual at the point-of-sale.

Transaction data input device 22 is also located at the point-of-sale and typically would be a keyboard or the like by which the sales clerk, for example, would enter the dollar amount of the merchandise purchased by the consumer and, if appropriate, any rebate or coupon values. Device 22 could be the cash register. Alternatively, device 20 and device 22 could share a single keyboard.

The consumer data and transaction data entered through devices 20, 22 may be temporarily stored in memory 24. Memory 24 may also include merchant data along with software to direct operation of computer 16 as will be described. The merchant data includes at least a merchant code number to identify that merchant. Merchant data may also include information indicating the time or location of the sale and/or the identification of the sales clerk, for example. Importantly, where the system is to provide an incentive based upon discounts offered by that merchant, memory 24 also preferably includes a credit rate selected by that merchant at which cash value is to be accumulated by the consumer for purchases from that merchant. The credit rate for one merchant is preferably selected by that merchant and not by any other merchant or the central system.

As is well understood, computer 16 will function in accordance with the operating program stored in memory 24. To this end, computer 16 may verify that the PIN number matches a code on the card to verify that the user is authorized on that card. Computer 16 will also preferably determine a credit value for the transaction based upon the transaction data input and the credit rate (e.g., purchase of $25.00 and credit rate of 0.10=$2.50 credit value) and will output to the central system 12, through I/O device 26 and communication line 30, the consumer's account number and birthdate if utilized, the credit value for that transaction and the merchant data. The credit value may additionally or alternatively be determined based upon a "cents-off" coupon or an advertised rebate or discount amount from a third party, plus any added incentive amount selected by the merchant. Thus, rather than have the merchant reduce cash flow by accepting less than the full amount of the sale from the consumer, the consumer will pay the full amount and build up a credit value for subsequent redemption in accordance with the invention. For example, the consumer may provide a "cents off" coupon at the point-of-sale and, instead of receiving an immediate cash return, the consumer will obtain as a credit value the amount of the coupon, plus the credit rate amount or other incentive, if any, in memory 24 selected by the merchant to be added thereto as an incentive. Similarly, a rebate or discount amount may be utilized to determine the credit value. The value of the coupon, rebate or discount may be input by the sales clerk at the point-of-sale or may be stored in memory 24 as appropriate for determining the credit value to be output through I/O device 26.

Central system 12 communicates with line 30 through its own I/O device 40. I/O devices 26 and 40 may be modems and line 30 a telephone line, for example. Further, each merchant location 14 may communicate with central system 12 either separately through I/O device 40 or collectively through multiple I/O devices 40 (only one shown) as is well understood.

Data received by central system 12 through I/O device 40 is coupled to common bus 42 which permits communication between I/O device 40, bill printer 44, access authorization unit 46, memory 48, consumer accounts memory 50, merchants account memory 52 and computer 54 which may also be a microprocessor and associated peripherals. Consumer accounts memory 50 includes a plurality of consumer accounts and, for each such account, includes at least an account number segment unique to that account and consumer, and a cash value segment. Each account may also include a birthdate segment applicable to that consumer. Alternatively, memory 50 could include a look-up table of all account numbers associated with a respective birthdate. Similarly, merchant account memory 52 includes a plurality of merchant accounts and, for each such account, includes at least a merchant code number segment unique to that account and merchant and a bill value segment.

The data received at I/O device 40 is sorted out by computer 54 under control of an operation program stored in memory 48. Specifically, the account number portion of the received data is examined to locate the consumer account in memory 50 having the same account number segment. The birthdate portion of the received data may be used to verify that the account is proper, i.e., it includes the same birthdate segment or is associated with that birthdate in the look-up table. Once the proper account is found, the cash value segment is incremented in relation to the amount of the credit value data received from the merchant for that transaction, such as in a one-to-one correspondence or other desired relationship. The received merchant data is similarly employed to locate the appropriate merchant account in memory 52. The bill value segment is then similarly incremented in relation to the amount of the credit value data received from that merchant. Additional merchant data segments may be included to provide a listing of transactions for each merchant when the bill is printed as will be described.

Periodically, such as once a month, each merchant account in memory 52 is examined. Where the system is based upon merchant incentives, the merchant is to be billed therefore. Accordingly, under such circumstances, if the bill value for any particular merchant is greater than zero, a bill is generated at printer 44 and the bill value for that merchant reset to zero. The bills printed by printer 44 may then be mailed to the respective merchants. Each of the bills may also include an added fee from the operator of central system 12 and may further include a list of transactions for that merchant if that information was stored in memory 52. Alternatively, or additionally, any coupon, rebate or discount values offered by a third party such as a manufacturer and submitted to the central system by the merchant may be applied against the bill value as a credit to reduce the bill value amount in memory 52 associated with that merchant's account such as where the central location acts as the clearing house for such incentives. In this way, compliance by the merchant with the terms of the third party's coupon or rebate program may be monitored. Under such a circumstance, memory 52 may further include third party account(s) in which all verified rebates or discounts are accumulated as third party bill values, and the third party(ies) periodically billed therefor whereby the clearing house may then obtain the credited bill value amount from the third party that provided the coupon or rebate or other such incentive.

Also, at selected times, each consumer account in memory 50 having a selected birthdate segment, for example, may be examined. For each such account, if the cash value is greater than zero, the amount of the cash value is provided to access authorization unit 46 along with at least the consumer's account number. The cash value in the consumer account is then reset to zero. In unit 46, which may be a memory, a consumer's access account is established having the consumer account number and an access value equal to the cash value. The access value may also include any access value not previously withdrawn by that consumer. Unit 46 may communicate with one or more electronic terminals adapted to dispense funds represented as at 60 such as the type used by individuals to access bank accounts to obtain or deposit funds. The consumer may enter a plastic card bearing the account number (and, if required, birthdate) in a terminal 60 which after verification against a PIN number entered by the consumer, for example, will access the consumer's access account in unit 46 and dispense funds up to the amount of the access value in that account. The amount of the access value will be reduced accordingly. Alternatively, unit 46 could be adapted to communicate with banking institutions for wire transfer or the like of funds directly to a consumer's bank account at selected intervals. As another alternative, unit 46 could be a check printer which prints checks for each consumer as appropriate. The checks so-printed may then be mailed to the respective consumers.

Preferably, the consumer accounts are examined and access to funds authorized at or near the time of the month and day of the consumer's birthdate. Thus, for example, each day, all accounts having that date as a birthdate segment will be examined and access to funds authorized. The examination could be on some other basis. For example, all accounts having birthdate segments for several consecutive days may be examined a week ahead of time so that access authorizations are provided or checks issued once a week. Other daily, weekly, biweekly or monthly schedules may be employed.

Although shown separately, where unit 46 is a printer, printers 44 and 46 could be the same printer. Printer 44 could alternatively be adapted to communicate with appropriate bank or like accounts for wire transfer or the like of funds from a merchant's or third party's account for collection and payment of the bill value and other fees. Although electronic, this alternative may still be deemed to be generating a bill within the scope of the invention. Also, consumer accounts memory 50 and merchant accounts memory 52 are shown separately but may be combined into one memory and may even form part of memory 48. Further, unit 46 may also utilize memory 48.

Data from each merchant location 14 may be transmitted to central station 12 concurrent with the point-of-sale transaction, or the memory 24 may temporarily store the data associated with one or more such transactions and then transmit the stored data to the central system at another time. The latter may be preferred so as not to unduly tie-up telephone lines or to take advantage of lower nighttime telephone rates, for example. Further, subsequent transmission may be under control of central system 12 and, thus, occur at a time or times most appropriate for central system 12 to spread out its tasks over a period of time.

Each merchant may have several points-of-sale each equipped with consumer and transaction data input devices 20, 22. Memory 24, computer unit 16 and I/O device 26 for each merchant location may be replicated at each point-of-sale. Preferably, however, only the input devices 20, 22 are so replicated for any merchant such that only one computer 16 associated with that merchant location is necessary.

In operation, when a consumer makes a purchase, the consumer's Social Security number and perhaps birthdate are entered along with the amount of the purchase at the point-of-sale. Where a plastic card with a magnetic stripe is used for entry of the consumer data, a PIN code is also entered and verified against a code stored on the card. A credit value for that transaction is then determined based upon the credit rate stored in memory 24 as selected by that merchant, if any, and the dollar or sales amount of the particular transaction involved and/or the value of any coupon, rebate or other discount. Subsequently, the consumer data, merchant data and credit value are transmitted to the central system whereat the cash value in the consumer account having the appropriate account or Social Security number and perhaps birthdate segments is incremented such as by the amount of the credit value. Similarly, at the central system, the bill value in the merchant account having the appropriate merchant code number segment is also incremented such as by the amount of the credit value. When a third party incentive is confirmed, the merchant's bill value will be reduced and a bill value for the third party increased and collection thereon undertaken. Periodically, such as monthly, the merchant bill value amounts represented by the coupon, rebate or discount amounts offered by the merchants are billed to the merchants and that portion of the bill value amount is subtracted from that merchant's account. Similarly, at selected intervals all consumers having one or more selected common birthdates, for example, are provided access to funds in the amount of the cash value shown in the consumer accounts associated with those individuals and the cash values then reset to zero. Such access may be by authorized access to an access account or by checks issued directly to that consumer, for example.

By virtue of the foregoing there is thus provided a centralized consumer cash value accumulation system wherein multiple merchants may participate and provide consumer incentives without reducing current cash flow and, optionally, with each merchant selecting its own rate at which consumers accumulate cash value incentives for their purchases. Furthermore, the system thus provided is secure in that access to money value is only at or through the central station.

While the present invention has been illustrated by description of an embodiment and while the illustrative embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of consumer cash value accumulation based upon point-of-sale transactions between consumers and merchants, the method comprising:
    a. at the point-of-sale, obtaining from the consumer an account number unique to the consumer;
    b. at a merchant location, determining a credit value for the transaction;
    c. electronically providing, for each transaction, from the merchant location to a central system the consumer's account number and the credit value;
    d. for each transaction, accumulating, at the central system, cash value in a consumer account associated with that consumer's account number by increasing the cash value in that consumer account in relation to the credit value.

2. The method of claim 1, which further comprises selectively providing to a plurality of the consumers access to funds in their respective consumer accounts, such access being based upon the cash value in that consumer account.

3. The method of claim 1, wherein the consumer account number is independent of how the consumer pays for the transaction.

4. The method of claim 1, wherein the step of determining a credit value for the transaction is based upon the amount of the transaction and the applicable credit rate determined by the merchant.

5. The method of claim 1, wherein access to funds is provided by issuing a check in an amount equal to the cash value in that consumer account.

6. The method of claim 1 wherein, for each transaction, merchant data associated with the merchant is electronically transmitted to the central system along with the consumer's account number and the credit value, the method further comprising:
    for each transaction, accumulating, at the central system, bill value in a merchant account associated with that merchant's merchant data by increasing the bill value in that merchant's account in relation to the credit value.

7. The method of claim 6 further comprising: generating for each merchant account a bill in an amount based upon the bill value in that merchant account.

8. A centralized consumer cash value system for transaction between consumers and multiple merchants comprising:
    at each merchant location at least:
        consumer data input means at the point-of-sale for inputting an account number;
        processor means for determining a credit value for the transaction; and
        first communication means for electronically transmitting to the central system the consumer's account number and the credit value related to each transaction; and
    at a central location a central system having at least:
        second communication means for electronically receiving the consumer's account number and the credit value related to each transaction; and
        consumer account memory means for storing cash values for a plurality of consumer accounts, each consumer account being associated with a respective, unique account number;
        processor means for incrementing the cash value in a consumer account associated with a received consumer account number in relation to the received credit value.

9. The system of claim 8, which further comprises unit means for selectively providing to a plurality of consumers access to funds in an amount based upon the cash value in the consumer account associated with that consumer.

10. The system of claim 8, further including, at each merchant location, memory means for storing a credit rate selected by the merchant, transaction data input means for inputting the sale amount of the transaction, said merchant location processor means further responsive to said memory means whereby said credit value is determined in accordance with said credit rate and the amount of the transaction.

11. The system of claim 9, said unit means including a check printer whereby access to funds is by printing a check in the amount of the cash value in that consumer's account.

12. The system of claim 8 wherein the first communication means also electronically transmits and the second communication means also electronically receives, related to each transaction, merchant data associated with the merchant along with the consumer's account number and the credit value, the central system further having:
    merchant account memory means for storing bill values for a plurality of merchant accounts, each merchant account being associated with respective merchant data; and
    said central system processor means further for incrementing the bill value in a merchant account associated with received merchant data by an amount corresponding to the received credit value.

13. The system of claim 12, the central system further having:
    means for issuing to each merchant a bill in an amount based upon the bill value in the merchant account associated with that merchant.

* * * * *